United States Patent
Do

(10) Patent No.: US 10,752,264 B2
(45) Date of Patent: Aug. 25, 2020

(54) END CARRIAGE OF A RAILWAY VEHICLE AND ASSOCIATED RAILWAY VEHICLE

(71) Applicant: Alstom Transport Technologies, Saint-Ouen (FR)

(72) Inventor: Huu-Thi Do, Rochefort (FR)

(73) Assignee: Alstom Transport Technologies, Saint-Ouen (FR)

( * ) Notice: Subject to any disclaimer, the term of this patent is extended or adjusted under 35 U.S.C. 154(b) by 349 days.

(21) Appl. No.: 15/694,247

(22) Filed: Sep. 1, 2017

(65) Prior Publication Data
US 2018/0065647 A1 Mar. 8, 2018

(30) Foreign Application Priority Data
Sep. 6, 2016 (FR) ..................... 16 58264

(51) Int. Cl.
*B61D 17/02* (2006.01)
*B61D 27/00* (2006.01)

(52) U.S. Cl.
CPC ........... *B61D 17/02* (2013.01); *B61D 27/009* (2013.01); *Y02T 30/32* (2013.01)

(58) Field of Classification Search
CPC .. B61D 27/0009; B61D 17/02; B61D 27/009; Y02T 10/82; Y02T 30/32; B62D 35/00; B62D 35/02; B62D 35/001; B61C 1/06
USPC .......................................... 105/1.1, 1.2, 1.3
See application file for complete search history.

(56) References Cited

U.S. PATENT DOCUMENTS

| 2,247,273 A | * | 6/1941 | Blomberg | B61D 17/04 105/1.2 |
| 2012/0318476 A1 | * | 12/2012 | Begleiter | B60T 5/00 165/51 |
| 2017/0183043 A1 | * | 6/2017 | Connors | B62D 35/001 |

FOREIGN PATENT DOCUMENTS

| DE | 4012277 A1 | 10/1991 | |
| DE | 10 2004 008 437 | * 9/2004 | |
| EP | 2213544 A1 | * 8/2010 | ............. B61D 17/02 |
| JP | H05262226 A | 10/1993 | |
| JP | H05270402 A | 10/1993 | |
| JP | H08-183451 A | 7/1996 | |
| JP | 2005145205 A | 6/2005 | |

OTHER PUBLICATIONS

Search Report dated May 10, 2017 during the prosecution of FR 1658264.

* cited by examiner

*Primary Examiner* — Mark T Le
(74) *Attorney, Agent, or Firm* — Troutman Pepper Hamilton Sanders LLP

(57) ABSTRACT

An end carriage that extends between a first free end and a second end intended to be connected to another carriage of the railway vehicle, the end carriage including a lower housing for a bogie made in proximity to the first end. The end carriage further includes at least one conduit, opening on the one hand into the lower housing, and opening on the other hand into the first end of the end carriage, and means for circulating air in the conduit.

8 Claims, 1 Drawing Sheet

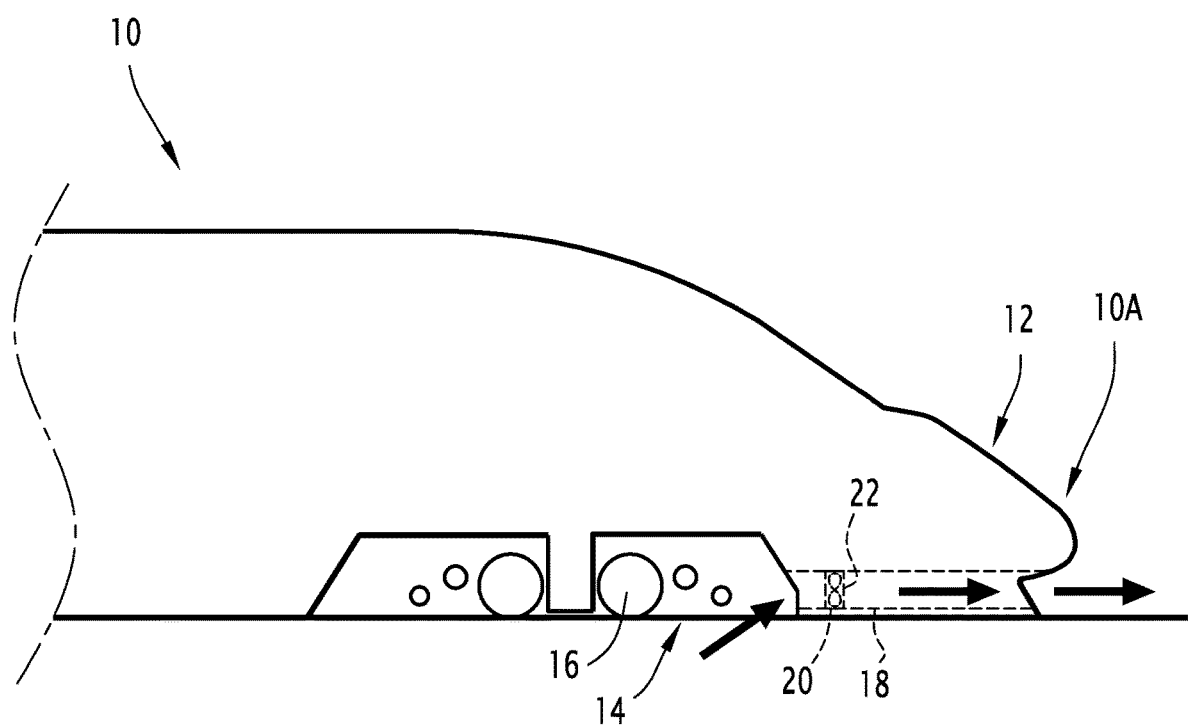

END CARRIAGE OF A RAILWAY VEHICLE AND ASSOCIATED RAILWAY VEHICLE

CROSS-REFERENCE TO RELATED APPLICATION

This application is based upon and claims the benefit of priority of the prior French Patent Application No. 16 58264, filed on Sep. 6, 2016, the entire contents of which are incorporated herein by reference.

FIELD OF THE INVENTION

The present invention relates to an end carriage for a railway vehicle.

BACKGROUND

A railway vehicle, notably a high-speed railway vehicle, is subject to a drag effect opposing the displacement of this railway vehicle. In order to reduce this drag effect, in the state of the art is already known an end carriage provided with a drag reducing device, modifying the geometry of this end carriage.

Notably the object of the invention is to provide another solution for reducing the drag effect, without modifying the shape of the end carriage.

SUMMARY

For this purpose, the object of the invention is notably an end carriage of a railway vehicle, extending between a first free end and a second end intended to be connected to another carriage of the railway vehicle, the end carriage including a lower housing for a bogie made in proximity to the first end, characterized in that it includes at least one substantially horizontal conduit, opening on the one hand into the lower housing, and opening on the other hand onto the first end of the carriage, and means for circulating air in the conduit.

By forcing the circulation of the air in each conduit, air is blown or sucked up at the first end of the carriage. This device allows better handling of the air flows in the wake of the carriage, and therefore gives the possibility of reducing the drag effect.

An end carriage according to the invention may further include one or several of the following features, taken alone or according to any technically conceivable combination:
  the means for circulating air are able to generate an air flow in the conduit, from the lower housing towards the first end of the end carriage;
  the means for circulating air are able to generate an air flow in the conduit, from the first end of the end carriage to the lower housing;
  the means for circulating air are reversible, between a first configuration in which the air flow is generated from the lower housing to the first end of the end carriage, and a second configuration in which the air flow is generated from the first end of the end carriage towards the lower housing;
  the means for circulating air are in the first configuration when the end carriage is laid out at the rear of the railway vehicle, and in the second configuration when the end carriage is laid out at the front of the railway vehicle;
  the means for circulating air are able to assume the first or the second configurations depending on the operating conditions of the railway vehicle;
  the means for circulating air include means for varying the speed of a generated air flow, according to a speed of displacement of the end carriage;
  the means for circulating air include at least one fan; and
  The invention also relates to a railway vehicle, including at least one end carriage as defined earlier.

DETAILED DESCRIPTION

The invention will be better understood upon reading the description which follows, only given as an example and made with reference to the single appended FIGURE schematically and partly illustrating an end carriage according to an exemplary embodiment of the invention.

In the FIGURE, an end carriage 10 intended to equip a railway vehicle, notably an intercity train is partly illustrated. For example, the railway vehicle includes such an end carriage 10 at each end.

A railway vehicle may usually circulate in two opposite directions, so that each end carriage 10 may be a front or rear end carriage, depending on the direction of circulation. Thus, the end carriages 10 of the railway vehicle are generally identical, so that only one of them will be described.

The end carriage 10 extends, in a longitudinal direction X, between a first free end 10A, and a second end 10B intended to be connected to another carriage of the railway vehicle. The first end 10A corresponds to the front or rear end of the railway vehicle, depending on the direction of circulation.

The end carriage 10 has a general aerodynamic shape, notably having, conventionally, a profile comprising a tip 12 at the first end 10A. Such a tip 12 is also called a "nose" of the end carriage 10.

The end carriage 10 moreover includes conventionally a lower housing 14 for a bogie 16. This lower housing 14 is made in proximity to the first end 10A. In other words, in the case when the end carriage 10 includes several lower housings for bogies, the lower housing 14 considered in the present description is the closest one to the first end 10A.

The end carriage 10 according to the invention includes at least one conduit 18, opening on the one hand into said lower housing 14, and opening on the other hand at the first end 10A of the end carriage 10.

Advantageously, each conduit 18 extends substantially horizontally. In other words, the ends of this conduit 18 are substantially found at the same height. Thus, each conduit 18 generally opens, on the one hand into a lower portion of the end carriage 10, and more particularly for example, below the nose 12 and, on the other hand, facing the bogie. The conduit 18 therefore extends advantageously substantially at the height of the bogie.

For example, each conduit 18 has a diameter comprised between 0.05 m and 0.5 m.

The end carriage 10 includes means 20 for circulating air in the conduit 18. The means for circulating air 20 for example include at least one fan 22.

Preferably, the means for circulating air 20 are reversible, between a first configuration in which the air flow is generated from the lower housing 14 towards the first end 10A of the end carriage 10 (this first configuration being illustrated in the FIGURE), and a second configuration in which the air flow is generated from the first end 10A of the end carriage 10 towards the lower housing 14.

Thus, in the first configuration, the conduit 18 expels air at the first end 10A, and in the second configuration, the conduit 18 sucks up air at the first end 10A.

In this case, the fan 22 is a bidirectional fan.

According to one alternative, the means for circulating air 20 are only capable of generating an air flow in the conduit 18, from the lower housing 14 to the first end 10A of the end carriage 10.

According to another alternative, the means for circulating air 20 are only capable of generating an air flow in the conduit 18, from the first end 10A of the carriage towards the lower housing 14.

However, the embodiment in which the means for circulating air 20 may assume the first and second configurations is preferred, since in this case, the configuration may be selected according to the operating conditions of the railway vehicle.

The operating conditions of the railway vehicle comprise, for example, the speed of the railway vehicle, the temperature outside the railway vehicle, the orientation of the wind in the outer surroundings of the train.

Alternatively, the means for circulating air 20 are configured for assuming the first and second configurations depending on the direction of circulation of the railway vehicle.

In this alternative, when the first end 10A is at the front of the railway vehicle, the means for circulating air 20 may be in the second configuration, sucking up air from the first end 10A of the carriage towards the lower housing 14, and when the first end 10A is at the rear of the railway vehicle, the means for circulating air 20 may be in the first configuration, expelling air through the first end 10A.

This suction or expulsion of air at the first end 10A has the effect of modifying the behavior of the air at the front and/or at the rear of the railway vehicle, then reducing the drag effect.

Advantageously, the means for circulating air 20 include means for varying the velocity of a generated air flow, according to a speed of displacement of the end carriage 10. The speed of the air flow depends on the speed of rotation of the fan 22, so that the variation means act on this fan 22.

The speed of the air flow is thereby adapted to the speed of displacement of the carriage 10, in order to optimize the reduction of the drag.

Advantageously, the speed of the air flow is modified in real time, depending on the instantaneous speed of the end carriage 10. For this purpose, automation may be provided by an active control feedback loop, of the type known per se.

The present invention gives the possibility, by acting on the air flows at the front and/or at the rear of the railway vehicle, of reducing the drag of this railway vehicle.

It will be noted that the invention is not limited to the embodiment described earlier, but may have diverse additional alternatives.

The invention claimed is:

1. An end carriage of a railway vehicle, extending between a first free end and a second end intended to be connected to another carriage of the railway vehicle, the end carriage including a lower housing for a bogie made in proximity to the first end, comprising:

at least one substantially horizontal conduit, opening on the one hand into the lower housing, and opening on the other hand into the first end of the end carriage, and an air circulator circulating air in the horizontal conduit, able to generate an air flow in the horizontal conduit, from the lower housing to the first end of the end carriage, wherein:

the air circulator is able to generate an air flow in the horizontal conduit, from the first end of the end carriage towards the lower housing;

the air circulator is reversible, between a first configuration in which the air flow is generated from the lower housing towards the first end of the end carriage, and a second configuration in which the air flow is generated from the first end of the end carriage towards the lower housing.

2. The end carriage according to claim 1, wherein the air circulator is in the first configuration when the end carriage is laid out at the rear of the railway vehicle, and in the second configuration when the end carriage is laid out at the front of the railway vehicle.

3. The end carriage according to claim 1, wherein the air circulator is able to assume the first or the second configurations depending on operating conditions of the railway vehicle.

4. The end carriage according to claim 1, wherein the air circulator is configured to vary the speed of a generated air flow, according to a speed of displacement of the end carriage.

5. The end carriage according to claim 1, wherein the air circulator comprises at least one fan.

6. A railway vehicle, characterized in that it includes at least one end carriage according to claim 1.

7. The end carriage according to claim 1, wherein the air circulator is configured to generate an air flow in the horizontal conduit, from the lower housing to the first end of the end carriage.

8. The end carriage according to claim 1, wherein the air circulator is configured to generate an air flow in the conduit, from the first end of the end carriage towards the lower housing.

* * * * *